US012500536B2

United States Patent
Wu

(10) Patent No.: US 12,500,536 B2
(45) Date of Patent: Dec. 16, 2025

(54) METHOD FOR ENABLING PERMANENT MAGNET SYNCHRONOUS MOTOR TO START IN REVERSE DIRECTION AND ASSOCIATED MOTOR DEVICE

(71) Applicant: Elite Semiconductor Microelectronics Technology Inc., Hsinchu (TW)

(72) Inventor: Ru-Chang Wu, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 189 days.

(21) Appl. No.: 18/595,432

(22) Filed: Mar. 5, 2024

(65) Prior Publication Data
US 2025/0286490 A1  Sep. 11, 2025

(51) Int. Cl.
*H02P 21/34* (2016.01)
*H02P 21/00* (2016.01)
*H02P 21/20* (2016.01)

(52) U.S. Cl.
CPC .......... *H02P 21/34* (2016.02); *H02P 21/0017* (2013.01); *H02P 21/20* (2016.02); *H02P 2207/05* (2013.01)

(58) Field of Classification Search
CPC ...... H02P 21/34; H02P 21/0017; H02P 21/20; H02P 2207/05
USPC ............................. 318/400.02, 400.01, 700
See application file for complete search history.

(56) References Cited

U.S. PATENT DOCUMENTS 7,178,618 B2 *  2/2007  Komeda .................. B60K 6/48
903/914
2021/0211079 A1   7/2021  Jian

FOREIGN PATENT DOCUMENTS

| CN | 101076426 A | 11/2007 |
| CN | 114070135 A | 2/2022 |
| TW | 202011683 A | 3/2020 |

* cited by examiner

*Primary Examiner* — David Luo
(74) *Attorney, Agent, or Firm* — Winston Hsu

(57) ABSTRACT

A method for enabling a permanent magnet synchronous motor (PMSM) to start in a reverse direction may include: estimating a load torque according to a torque and an actual rotational speed of the PMSM, to generate an estimated load torque; controlling the torque according to the estimated load torque to decelerate the PMSM, until the actual rotational speed of the PMSM is reduced to a predetermined target rotational speed; in response to the actual rotational speed of the PMSM being reduced to the predetermined target rotational speed, determining whether an energy of the PMSM is not greater than a threshold value, wherein the energy of the PMSM comprises a potential energy; and in response to the energy of the PMSM not being greater than the threshold value, starting to control the torque for making the PMSM rotate in a forward direction.

14 Claims, 4 Drawing Sheets

METHOD FOR ENABLING PERMANENT MAGNET SYNCHRONOUS MOTOR TO START IN REVERSE DIRECTION AND ASSOCIATED MOTOR DEVICE

BACKGROUND OF THE INVENTION

1. Field of the Invention

The present invention is related to a permanent magnet synchronous motor (PMSM), and more particularly, to a method for enabling the PMSM to start in a reverse direction and an associated motor device.

2. Description of the Prior Art

A PMSM is often applied to a home appliance or an industrial appliance (e.g., an electric fan or an air conditioner exhaust fan). In some cases, the PMSM may not be stationary when being started. For example, under a condition that a fan is placed outdoors, external wind resistance may cause the PMSM applied to the fan to be reversed, resulting in starting failure. A conventional method may use an additional braking circuit to reduce a rotational speed of the PMSM to 0 when the PMSM is reversed, and then start the PMSM in a stationary state. Some problems may occur, however. The conventional method only considers the rotation speed of the PMSM (i.e., a kinetic energy of the PMSM). If a load (e.g., the fan) of the PMSM is changed (e.g., changed from a light fan blade to a heavy one), a potential energy of the PMSM may cause the PMSM to fail to start during reversal due to different flexible structures and inertia of different fans. As a result, a novel method that considers the potential energy of the PMSM (e.g., simultaneously considers the kinetic energy and the potential energy of the PMSM) to determine a starting timing of the PMSM during reversal and an associated motor device are urgently needed, to improve a starting success rate of the PMSM during reversal.

SUMMARY OF THE INVENTION

It is therefore one of the objectives of the present invention to provide a method for enabling a PMSM to start in a reverse direction and an associated motor device, to address the above-mentioned issues.

According to an embodiment of the present invention, a method for enabling a PMSM to start in a reverse direction is provided. The method may comprise: estimating a load torque according to a torque and an actual rotational speed of the PMSM, to generate an estimated load torque; controlling the torque according to the estimated load torque to decelerate the PMSM, until the actual rotational speed of the PMSM is reduced to a predetermined target rotational speed; in response to the actual rotational speed of the PMSM being reduced to the predetermined target rotational speed, determining whether an energy of the PMSM is not greater than a threshold value, wherein the energy of the PMSM comprises a potential energy; and in response to the energy of the PMSM not being greater than the threshold value, starting to control the torque for making the PMSM rotate in a forward direction.

According to an embodiment of the present invention, a motor device is provided. The motor device may include a PMSM, a load torque estimation circuit, and a torque control circuit. The load torque estimation circuit may be arranged to estimate a load torque according to a torque and an actual rotational speed of the PMSM, to generate an estimated load torque. The torque control circuit may include a torque controller, and the torque controller may be arranged to: control the torque according to the estimated load torque to decelerate the PMSM until the actual rotational speed of the PMSM is reduced to a predetermined target rotational speed; in response to the actual rotational speed of the PMSM being reduced to the predetermined target rotational speed, determine whether an energy of the PMSM is not greater than a threshold value, wherein the energy of the PMSM comprises a potential energy; and in response to the energy of the PMSM not being greater than the threshold value, start to control the torque for making the PMSM rotate in a forward direction.

One of the benefits of the present invention is that, by the method for enabling a PMSM to start in a reverse direction and an associated motor device proposed by the present invention, both the kinetic energy and the potential energy of the PMSM are considered to determine a starting timing of the PMSM during reversal, which can greatly enhance the success rate of starting the PMSM in reverse.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
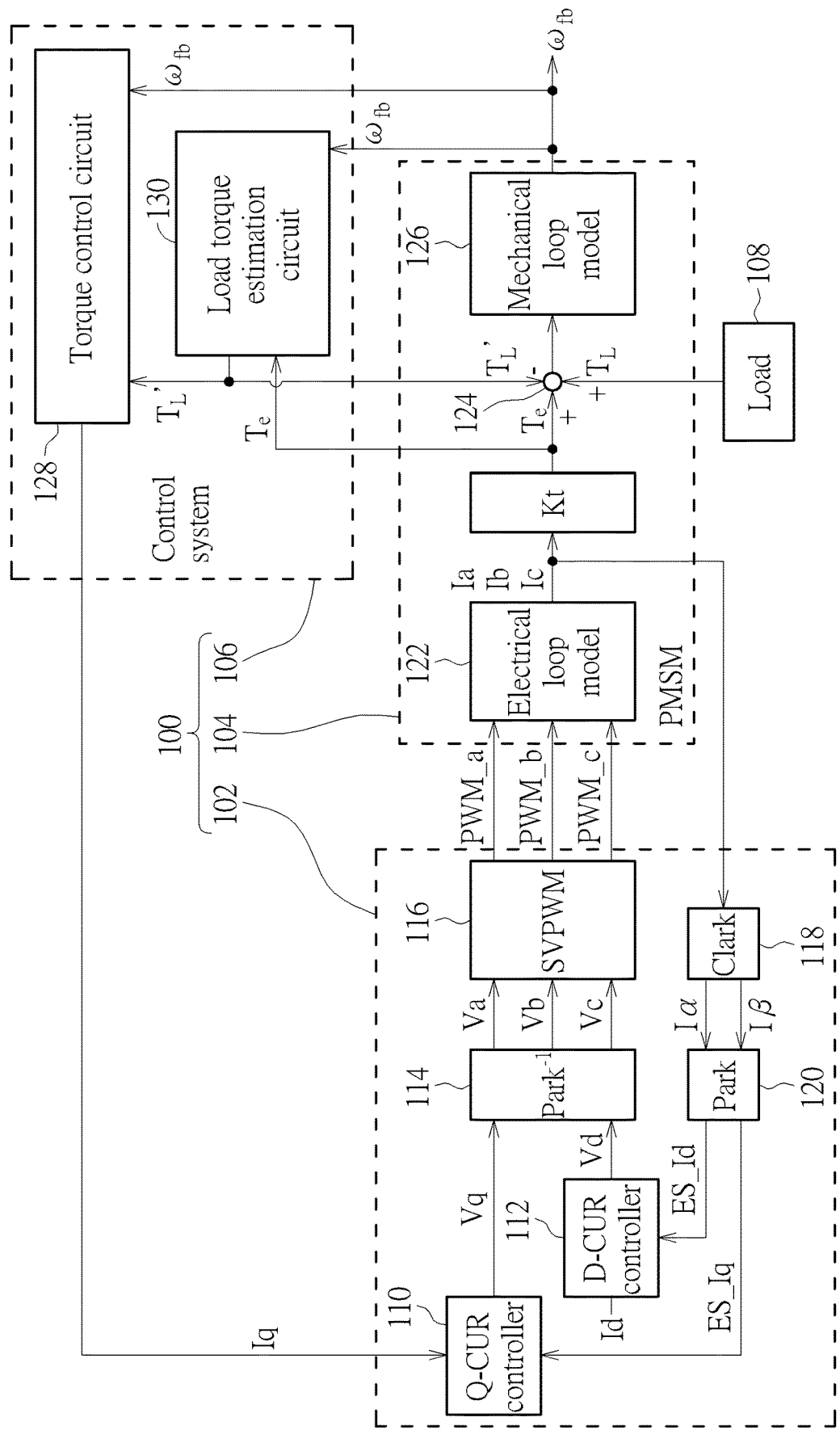
FIG. 1 is a diagram illustrating a motor device according to an embodiment of the present invention.

FIG. 1 is a diagram illustrating a motor device 100 according to an embodiment of the present invention. As shown in FIG. 1, the motor device 100 may include a driving circuit 102, a permanent magnet synchronous motor (PMSM) 104, and a control system 106, wherein the PMSM 104 may include a stator and a rotor, the stator may include (but not limited to) a three phase stator winding, and the rotor may include (but not limited to) a permanent magnet or squirrel cage winding. In addition, the motor device 100 is applied to a load 108. The driving circuit 102 may include a q-axis current controller (for brevity, labeled as "Q-CUR controller" in FIG. 1) 110, a d-axis current controller (for brevity, labeled as "D-CUR controller" in FIG. 1) 112, an inverse park transform module (for brevity, labeled as "Park$^{-1}$" in FIG. 1) 114, a space-vector pulse width modulation (SVPWM) module 116, a clark transform module (for brevity, labeled as "Clark" in FIG. 1) 118, and a park transform module (for brevity, labeled as "Park" in FIG. 1) 120. The q-axis current controller 110 may be arranged to receive a q-axis current reference signal Iq from the control system 106 and an estimated q-axis current signal ES_Iq from the park transform module 120, and compare the estimated q-axis current signal ES_Iq with the q-axis current reference signal Iq to generate a q-axis voltage driving signal Vq. Similarly, the d-axis current controller 112 may be arranged to receive a d-axis current reference signal Id (e.g., the d-axis reference current signal Id is equal to 0; i.e. Id=0) from a user input or an external source and an estimated d-axis current signal ES_Id from the park transform module 120, and compare the estimated d-axis current signal ES_Id with the d-axis current reference signal Id to generate a d-axis voltage driving signal Vd.

The inverse park transform module 114 may be arranged to receive the q-axis voltage driving signal Vq and the d-axis voltage driving signal Vd, and perform an inverse park transform upon the q-axis voltage driving signal Vq and the d-axis voltage driving signal Vd to generate multiple three-phase voltage driving signals Va, Vb, and Vc. The SVPWM module 116 may be arranged to generate multiple three-phase PWM duty signals PWM_a, PWM_b, and PWM_c according to the three-phase voltage driving signals Va, Vb, and Vc, for driving the PMSM 104. After the PMSM 104 is driven by the three-phase PWM duty signals PWM_a, PWM_b, and PWM_c, multiple three-phase current signals Ia, Ib, and Ic may be received by the clark transform module 118, and the clark transform module 118 may be arranged to perform a clark transform upon the three-phase current signals Ia, Ib, and Ic to generate multiple alpha/beta-domain current signals I$\alpha$ and I$\beta$. The park transform module 120 may be arranged to receive the alpha/beta-domain current signals I$\alpha$ and I$\beta$ from the clark transform module 118, and perform a park transform upon the alpha/beta-domain current signals I$\alpha$ and I$\beta$ to generate the estimated q-axis current signal ES_Iq and the estimated d-axis current signal ES_Id.

The PMSM 104 may include an electrical loop model 122, a subtraction circuit 124, and a mechanical loop model 126. It is assumed that the electrical loop model 122 is a combination of a resistor R and an inductor L. The three-phase PWM duty signals PWM_a, PWM_b, and PWM_c may be transmitted to the electrical loop model 122, and the electrical loop model 122 may be obtained by the following equation in t-domain:

$$V(t) = L * \frac{dI}{dt} + I(t) * R$$

wherein V(t) represents a voltage value in the t-domain that corresponds to one of the three-phase PWM duty signals PWM_a, PWM_b, and PWM_c, L is an inductance value of the inductor L, I(t) represents a current value in the t-domain that corresponds to one of the three-phase current signals Ia, Ib, and Ic output by the electrical loop model 122, R is a resistance value of the resistor R, a Laplace transform can be performed upon the above-mentioned equation to obtain an equation in the s-domain as follows:

$$V(s) = (L * s + R) * I(s)$$

and the electrical loop model 122 (denoted by "$G_E$") can be obtained by the following equation for deriving the three-phase current signals Ia, Ib, and Ic:

$$G_E = \frac{I(s)}{V(s)} = \frac{1}{L * s + R}$$

After the three-phase current signals Ia, Ib, and Ic are derived by the electrical loop model 122, the three-phase current signals Ia, Ib, and Ic can be transferred into a torque $T_e$ through a torque constant Kt. The subtraction circuit 124 may be arranged to receive the torque $T_e$ from the electrical loop model 122, receive a load torque $T_L$ caused by the load 108, receive an estimated load torque $T_L'$ from the control system 106, and subtract the estimated load torque $T_L'$ from the torque $T_e$ and load torque $T_L$ to generate a subtraction result SUB_R (i.e., SUB_R=$T_e$+$T_L$−$T_L'$), wherein the load torque $T_L$ may be reduced/canceled by the estimated load torque $T_L'$.

The mechanical loop model 126 may be arranged to receive the subtraction result SUB_R, and may be obtained by the following equation in the t-domain:

$$T(t) = J * \alpha + B * \omega(t) = J * \frac{d\omega}{dt} + B * \omega(t)$$

wherein T(t) represents a torque value in the t-domain that corresponds to the subtraction result SUB_R, J is a rotational inertia of the mechanical loop model 126, $\beta$ is a viscosity of the mechanical loop model 126, $\alpha$ is an angular acceleration of the mechanical loop model 126, $\omega$(t) is an angular velocity in the t-domain of the mechanical loop model 126 (i.e., an actual rotational speed $\omega_{fb}$ of the PMSM 104), a Laplace transform can be performed upon the above-mentioned equation, to obtain an equation in the s-domain as follows:

$$T(s) = (J * s + B) * \omega(t)$$

and the mechanical loop model 126 (denoted by "$G_M$") can be obtained by the following equation for deriving the actual rotational speed $\omega_{fb}$ Of the PMSM 104:

$$G_M = \frac{\omega(s)}{T(s)} = \frac{1}{J * s + B}$$

Figure 2:
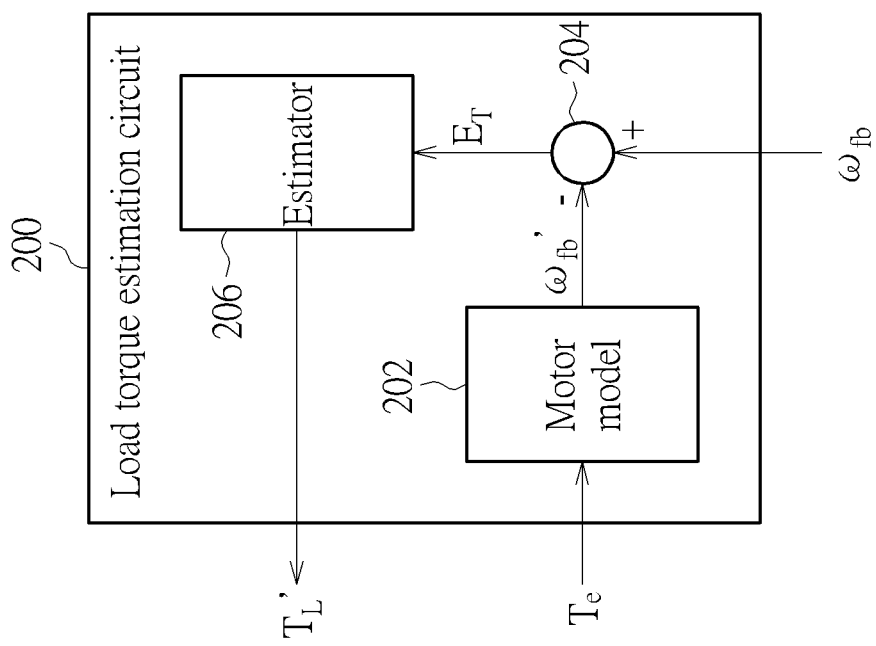
FIG. 2 is a diagram illustrating a load torque estimation circuit according to an embodiment of the present invention.

The control system 106 may include a load torque estimation circuit 130 and a torque control circuit 128. The load torque estimation circuit 130 may be arranged to receive the torque $T_e$ and the actual rotational speed $\omega_{fb}$ from the PMSM 104, and estimate the load torque $T_L$ according to the torque $T_e$ and the actual rotational speed $\omega_{fb}$, to generate the estimated load torque $T_L'$. Specifically, please refer to FIG. 2. FIG. 2 is a diagram illustrating a load torque estimation circuit 200 according to an embodiment of the present invention, wherein the load torque estimation circuit 130 shown in FIG. 1 may be implemented by the load torque estimation circuit 200. As shown in FIG. 2, the load torque estimation circuit 200 may include a motor model 202, a subtraction circuit 204, and an estimator 206. The motor model 202 may be a mechanical loop model, and may be arranged to receive the torque $T_e$ from the PMSM 104, and convert the torque $T_e$ into an ideal rotational speed $\omega_{fb}'$ of the PMSM 104. Since operations of the motor model 202 are similar to that of the mechanical loop model 126 of the PMSM 104, further descriptions are omitted here for brevity.

The subtraction circuit 204 may be arranged to receive the ideal rotational speed $\omega_{fb}'$ from the motor model 202, receive the actual rotational speed $\omega_{fb}$ from the PMSM 104 (more particularly, the mechanical loop model 126), and subtract the ideal rotational speed $\omega_{fb}'$ from the actual rotational speed $\omega_{fb}$ to generate a subtraction result acting as a rotation speed error $E_T$ (i.e., $E_T=\omega_{fb}-\omega_{fb}'$), wherein the rotation speed error $E_T$ is caused by the load torque $T_L$. The estimator 206 may be arranged to receive the rotation speed error $E_T$ from the subtraction circuit 204, and estimate the load torque $T_L$ according to the rotation speed error $E_T$ to generate the estimated load torque $T_L'$. For example, the estimator 206 (denoted by "$E_S$") can be obtained by the following equation in the s-domain:

$$E_S = \frac{Kl_1 * s + Kl_2}{s}$$

wherein $Kl_1$ and $Kl_2$ are coefficients for adjusting the integral speed.

Figure 3:
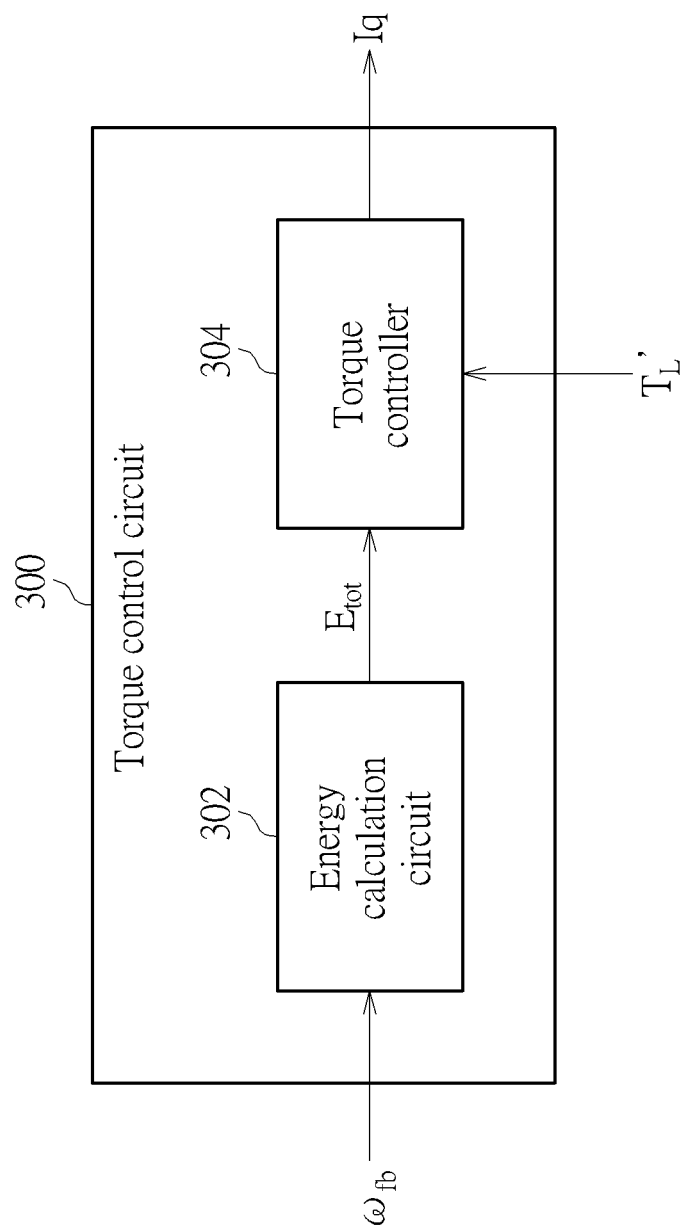
FIG. 3 is a diagram illustrating a torque control circuit according to an embodiment of the present invention.

After the estimated load torque $T_L'$ is generated, the estimator 206 may output the estimated load torque $T_L'$ to the PMSM 104 (more particularly, the subtraction circuit 124) to reduce/cancel the load torque $T_L$. In addition, the estimator 206 may output the estimated load torque $T_L'$ to the torque control circuit 128 for further use. For example, the torque control circuit 128 may control the torque $T_e$ according to the estimated load torque $T_L'$ through feeding the q-axis current reference signal Iq back to the driving circuit 102 (i.e., the torque $T_e$ is controlled by outputting a q-axis current), to decelerate the PMSM 104 until the actual rotational speed $\omega_{fb}$ of the PMSM 104 is reduced to a predetermined target rotational speed $\omega_T$. In detail, please refer to FIG. 3. FIG. 3 is a diagram illustrating a torque control circuit 300 according to an embodiment of the present invention, wherein the torque control circuit 128 shown in FIG. 1 may be implemented by the torque control circuit 300. As shown in FIG. 3, the torque control circuit 300 may include an energy calculation circuit 302 and a torque controller 304. The energy calculation circuit 302 may be arranged to receive the actual rotational speed $\omega_{fb}$ from the PMSM 104 (more particularly, the mechanical loop model 126), and calculate a total energy $E_{tot}$ of the PMSM 104 according to the actual rotational speed $\omega_{fb}$.

The total energy $E_{tot}$ of the PMSM 104 may include a kinetic energy $E_K$ and a potential energy $E_P$ (i.e., $E_{tot}=E_K+E_P$). The kinetic energy $E_K$ may be calculated by the following equation:

$$E_K = \frac{1}{2} * J * \omega^2$$

wherein J is a rotational inertia of the PMSM 104, and $\omega$ is the actual rotational speed $\omega_{fb}$.

The potential energy $E_P$ may be regarded as an elastic potential energy caused by flexible structures (e.g., a flexible structure of the load 108 and a flexible structure of the PMSM 104), and may be calculated by the following equation:

$$E_P = \frac{1}{2} * k * \theta^2$$

wherein k is an elastic coefficient of the PMSM 104, and $\theta$ is a deformation angle of the PMSM 104.

Due to cost considerations, the motor device 100 does not include a position sensor, which results in an unknown deformation angle $\theta$ of the PMSM 104. However, when the PMSM 104 is decelerated by a deceleration $\alpha$ through the torque $T_e$, the deformation angle $\theta$ of the PMSM 104 can be obtained by the following equation:

$$T_e = J * \alpha = k * \theta$$

wherein J is the rotational inertia of the PMSM 104, k is the elastic coefficient of the PMSM 104, and the potential energy $E_P$ may be further calculated by the following equation:

$$E_P = \frac{1}{2} * k * \theta^2 = \frac{1}{2} \frac{(J*\alpha)^2}{k}$$

In this way, after the actual rotational speed $\omega_{fb}$ is received, the energy calculation circuit 302 may calculate the total energy $E_{tot}$ by the following equation:

$$E_{tot} = E_K + E_P = \frac{1}{2} * J * \omega^2 + \frac{1}{2} \frac{(J*\alpha)^2}{k}$$

The torque controller 304 may receive a calculated value of the total energy $E_{tot}$ from the energy calculation circuit 302, receive the estimated load torque $T_L'$ from the load torque estimation circuit 130, and decelerate the PMSM 104 by controlling the torque $T_e$ according to the estimated load torque $T_L'$ and the total energy $E_{tot}$. For example, under a condition that the load torque $T_L$ causes the PMSM 104 to be reversed, the estimated load torque $T_L'$ may be estimated and generated by the load torque estimation circuit 130 (e.g., $T_L=T_L'=-0.5$ N-m). The torque controller 304 may control the torque $T_e$ to apply a larger torque (e.g., 5 N-m) to the PMSM 104, so that the PMSM 104 starts to decelerate from a reverse direction. Afterwards, the torque controller 304 may determine whether the actual rotational speed $\omega_{fb}$ of PMSM 104 is reduced to the predetermined target rotational speed $\omega_T$. In response to the actual rotational speed $\omega_{fb}$ of PMSM 104 being reduced to the predetermined target rotational speed $\omega_T$, the torque controller 304 may be further arranged to determine whether the total energy $E_{tot}$ of the PMSM 104 is not greater than a threshold value TH_V. It should be noted that the threshold value TH_V depends upon a full load output current of the driving circuit 102. For example, the threshold value TH_V may be set as one-tenth of the full-load output current, but the present invention is not limited thereto.

In response to the total energy $E_{tot}$ of the PMSM 104 not being greater than the threshold value TH_V, the torque controller 304 may start to control the torque $T_e$ to make the PMSM 104 rotate in a forward direction. In response to the total energy $E_{tot}$ of the PMSM 104 being greater than the threshold value TH_V, since the torque $T_e$ is proportional to the deceleration $\alpha$ applied to PMSM 104 (i.e., $T_e=J*\alpha$, wherein J is the rotational inertia of the PMSM 104, and is an known value), the torque controller 304 may control the torque $T_e$ to make the deceleration $\alpha$ not greater than a predetermined deceleration P_D, for making the total energy $E_{tot}$ of the PMSM 104 not greater than the threshold value TH_V, wherein the predetermined deceleration P_D is obtained according to the total energy $E_{tot}$ of the PMSM, the threshold value TH_V, and the predetermined target rotational speed $\omega_T$.

For example, it is assumed that the elastic coefficient of the PMSM 104 is 20 (i.e., k=20), the rotational inertia of the PMSM 104 is 0.003 kg/m^2 (i.e., J=0.003), the predetermined target rotational speed $\omega_T$ is 2 rad/s, and the threshold value TH_V is 0.02. The predetermined deceleration P_D can be derived by the following equation:

$$E_{tot} = \frac{1}{2} * 0.003 * 2^2 + \frac{1}{2}\frac{(0.003 * \alpha)^2}{20} \leq 0.02$$

and the equation can be simplified as follows:

$$\alpha \leq 188 \text{ rad/s}^2$$

wherein the predetermined deceleration P_D can be set as 188 rad/s^2. As a result, in order to make the total energy $E_{tot}$ not greater than 0.02, the torque controller 304 should control the torque $T_e$ to make the deceleration $\alpha$ not greater than 188 rad/s^2, so that it can be determined that the PMSM 104 is close to the stationary state, and the torque controller 304 can start to control the torque $T_e$ to make the PMSM 104 rotate in a forward direction.

Consider a case where only the rotational speed of the PMSM 104 (i.e., the kinetic energy $E_K$ of the PMSM 104) is considered to determine the starting timing during reversal. In this case, if the load 108 is changed (e.g., change from a light load to a heavy load), since the flexible structures and inertia of different loads are different, the potential energy $E_P$ of the PMSM 104 during reverse starting will be different, thereby causing the success rate of reverse starting to decrease. For the present invention, the determination condition of the starting timing from the reverse rotation to the forward rotation for the PMSM 104 is set as the total energy $E_{tot}$ including the kinetic energy Ex and the potential energy $E_P$. As a result, even if the flexible structures and the inertia are different after changing the load 108, the present invention can determine whether the PMSM 104 is close to the stationary state by determining whether the total energy $E_{tot}$ is not greater than the threshold value TH_V, and make the PMSM 104 start to rotate in a forward direction in response to the total energy $E_{tot}$ not being greater than the threshold value TH_V, which can greatly improve the success rate of reverse starting.

Figure 4:
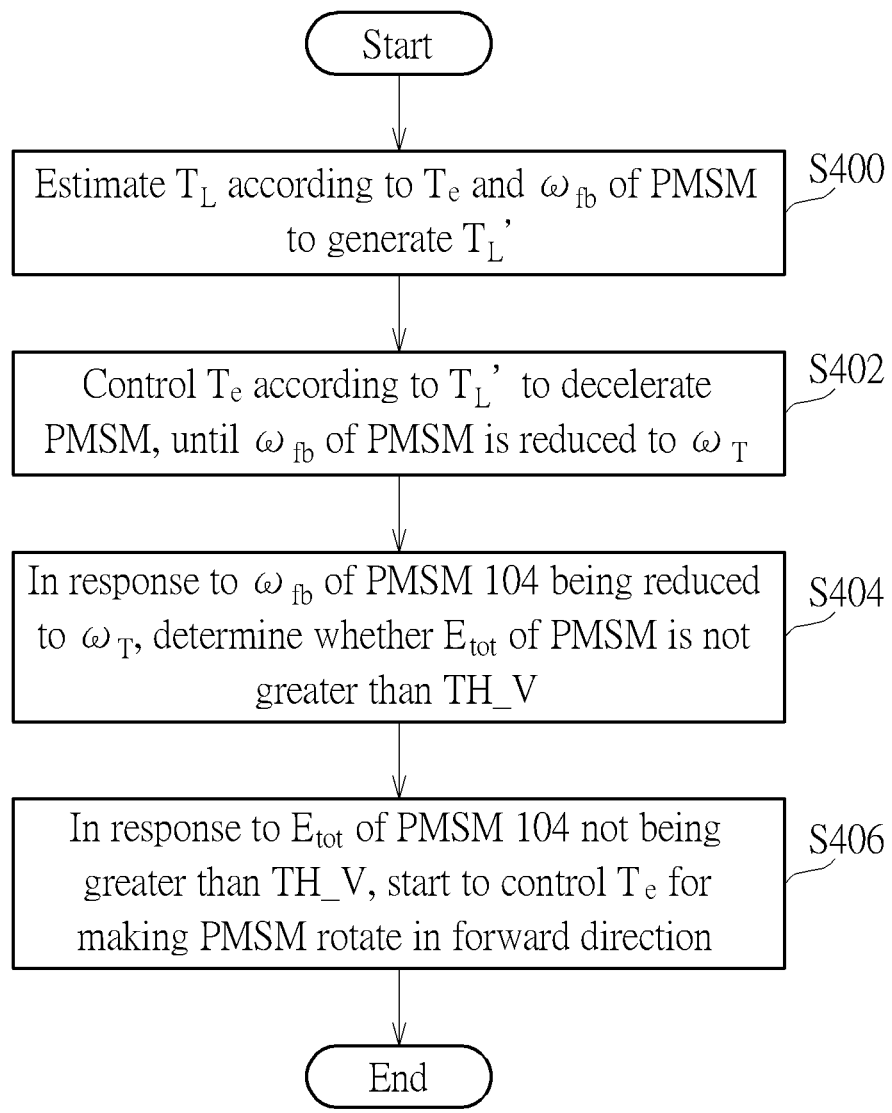
FIG. 4 is a flow chart of a method for enabling a PMSM to start in a reverse direction according to an embodiment of the present invention.

FIG. 4 is a flow chart of a method for enabling a PMSM to start in a reverse direction according to an embodiment of the present invention. Provided that the result is substantially the same, the steps are not required to be executed in the exact order shown in FIG. 4. For example, the method shown in FIG. 4 may be employed by the load torque estimation circuit 130 and the torque control circuit 128 shown in FIG. 1.

In Step S400, the load torque $T_L$ is estimated according to the torque $T_e$ and the actual rotational speed $\omega_{fb}$ of the PMSM 104, to generate the estimated load torque $T_L'$.

In Step S402, the torque $T_e$ is controlled according to the estimated load torque $T_L'$ to decelerate the PMSM 104, until the actual rotational speed $\omega_{fb}$ of the PMSM 104 is reduced to the predetermined target rotational speed $\omega_T$.

In Step S404, in response to the actual rotational speed $\omega_{fb}$ of the PMSM 104 being reduced to the predetermined target rotational speed $\omega_T$, it is determined that whether the total energy $E_{tot}$ of the PMSM 104 is not greater than the threshold value TH_V.

In Step S406, in response to the total energy $E_{tot}$ of the PMSM 104 not being greater than the threshold value TH_V, it is started to control the torque $T_e$ for making the PMSM 104 rotate in a forward direction.

Since a person skilled in the pertinent art can readily understand details of the steps after reading above paragraphs directed to the load torque estimation circuit 130 and the torque control circuit 128 shown in FIG. 1, further description is omitted here for brevity.

In summary, by the method for enabling a PMSM to start in a reverse direction and an associated motor device proposed by the present invention, both the kinetic energy and the potential energy of the PMSM are considered to determine a starting timing of the PMSM during reversal, which can greatly enhance the success rate of starting the PMSM in reverse.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enabling a permanent magnet synchronous motor (PMSM) to start in a reverse direction, comprising:
    estimating a load torque according to a torque and an actual rotational speed of the PMSM, to generate an estimated load torque;
    controlling the torque according to the estimated load torque to decelerate the PMSM, until the actual rotational speed of the PMSM is reduced to a predetermined target rotational speed;
    in response to the actual rotational speed of the PMSM being reduced to the predetermined target rotational speed, determining whether an energy of the PMSM is not greater than a threshold value, wherein the energy of the PMSM comprises a potential energy; and
    in response to the energy of the PMSM not being greater than the threshold value, starting to control the torque for making the PMSM rotate in a forward direction.

2. The method of claim 1, wherein the step of estimating the load torque according to the torque and the actual rotational speed of the PMSM, to generate the estimated load torque comprises:
    converting the torque into an ideal rotational speed;
    subtracting the ideal rotational speed from the actual rotational speed to generate a subtraction result; and
    estimating the load torque according to the subtraction result to generate the estimated load torque.

3. The method of claim 1, further comprising:
    outputting the estimated load torque to the PMSM, to reduce the load torque.

4. The method of claim 1, further comprising:
    calculating the energy of the PMSM according to the actual rotational speed of the PMSM.

5. The method of claim 1, wherein the torque is controlled by outputting a q-axis current.

6. The method of claim 1, further comprising:
    controlling the torque to make a deceleration of the PMSM not greater than a predetermined deceleration, for making the energy of the PMSM not greater than the threshold value, wherein the predetermined deceleration is obtained according to the energy of the PMSM, the threshold value, and the predetermined target rotational speed.

7. The method of claim 1, wherein the energy of the PMSM further comprises a kinetic energy.

8. A motor device, comprising:
a permanent magnet synchronous motor (PMSM);
a load torque estimation circuit, arranged to estimate a load torque according to a torque and an actual rotational speed of the PMSM, to generate an estimated load torque; and
a torque control circuit, comprising:
  a torque controller, arranged to:
    control the torque according to the estimated load torque to decelerate the PMSM until the actual rotational speed of the PMSM is reduced to a predetermined target rotational speed;
    in response to the actual rotational speed of the PMSM being reduced to the predetermined target rotational speed, determine whether an energy of the PMSM is not greater than a threshold value, wherein the energy of the PMSM comprises a potential energy; and
    in response to the energy of the PMSM not being greater than the threshold value, start to control the torque for making the PMSM rotate in a forward direction.

9. The motor device of claim 8, wherein the load torque estimation circuit comprises:
a motor model, arranged to convert the torque into an ideal rotational speed;
a subtraction circuit, arranged to subtract the ideal rotational speed from the actual rotational speed to generate a subtraction result; and
an estimator, arranged to estimate the load torque according to the subtraction result.

10. The motor device of claim 8, wherein the load torque estimation circuit is further arranged to output the estimated load torque to the PMSM, to reduce the load torque.

11. The motor device of claim 8, wherein the torque control circuit comprises:
an energy calculation circuit, arranged to calculate the energy of the PMSM according to the actual rotational speed of the PMSM.

12. The motor device of claim 8, wherein the torque is controlled by outputting a q-axis current.

13. The motor device of claim 8, wherein the torque control circuit is further arranged to control the torque to make a deceleration of the PMSM not greater than a predetermined deceleration, for making the energy of the PMSM not greater than the threshold value, wherein the predetermined deceleration is obtained according to the energy of the PMSM, the threshold value, and the predetermined target rotational speed.

14. The motor device of claim 8, wherein the energy of the PMSM further comprises a kinetic energy.

* * * * *